United States Patent
McNulty et al.

(10) Patent No.: US 11,852,247 B2
(45) Date of Patent: Dec. 26, 2023

(54) OUTLET VALVE ARRANGEMENTS FOR ENHANCED PUMP EFFICIENCY

(71) Applicant: GOJO Industries, Inc., Akron, OH (US)

(72) Inventors: John J. McNulty, Broadview Heights, OH (US); Donald R. Harris, Cuyahoga Falls, OH (US); Nick E. Ciavarella, Seven Hills, OH (US); Daniel M. Willis, Clinton, OH (US); Aaron D. Marshall, Uniontown, OH (US)

(73) Assignee: GOJO Industries, Inc., Akron, OH (US)

( * ) Notice: Subject to any disclaimer, the term of this patent is extended or adjusted under 35 U.S.C. 154(b) by 54 days.

(21) Appl. No.: 17/387,186

(22) Filed: Jul. 28, 2021

(65) Prior Publication Data
US 2021/0356046 A1     Nov. 18, 2021

Related U.S. Application Data

(63) Continuation of application No. 16/282,462, filed on Feb. 22, 2019, now Pat. No. 11,079,022.

(Continued)

(51) Int. Cl.
*F16K 1/30*          (2006.01)
*A47K 5/14*          (2006.01)
(Continued)

(52) U.S. Cl.
CPC ............ *F16K 1/307* (2013.01); *A47K 5/1207* (2013.01); *A47K 5/1208* (2013.01); *A47K 5/14* (2013.01);
(Continued)

(58) Field of Classification Search
CPC .. A47K 5/1207; A47K 5/1208; A47K 5/1209; A47K 5/1211; A47K 5/1217;
(Continued)

(56) References Cited

U.S. PATENT DOCUMENTS 3,258,175 A      6/1966   Taylor
4,561,571 A *   12/1985   Chen .................... A47K 5/1208
                                                     222/207

(Continued)

FOREIGN PATENT DOCUMENTS

EP            2087825 A2     8/2009
WO       2013079418 A1     6/2013

OTHER PUBLICATIONS

Invitation to Pay Additional Fees from PCT/US2019/019202 dated May 27, 2019 (14 pages).

*Primary Examiner* — Vishal Pancholi
*Assistant Examiner* — Robert K Nichols, II
(74) *Attorney, Agent, or Firm* — Calfee, Halter & Griswold LLP

(57) ABSTRACT

A dispenser includes a housing, an inverted container disposed in the housing, a outlet nozzle, a pump, a first check valve, and a second check valve. The pump is disposed between the container and the outlet nozzle. The pump includes a pump inlet a pump outlet, and a pump chamber. The pump chamber is movable between an expanded position and a compressed position. The first check valve is disposed between the pump and the outlet nozzle, and the first check valve has a first cracking pressure. The second check valve is disposed between the first check valve and the outlet nozzle, and the second check valve has a second cracking pressure. The second cracking pressure of the second check valve is greater than the first cracking pressure of the first check valve.

18 Claims, 2 Drawing Sheets

Related U.S. Application Data

(60) Provisional application No. 62/637,487, filed on Mar. 2, 2018.

(51) Int. Cl.
*B05B 11/00* (2023.01)
*A47K 5/12* (2006.01)
*F16K 15/18* (2006.01)
*B05B 11/10* (2023.01)

(52) U.S. Cl.
CPC ...... *B05B 11/0075* (2013.01); *B05B 11/1023* (2023.01); *F16K 15/1826* (2021.08); *B05B 11/0062* (2013.01)

(58) Field of Classification Search
CPC .......... F04B 19/22; F04B 43/00; F04B 43/02; F04B 53/1002; B05B 11/3071; B67D 3/0029; F16K 15/00; F16K 15/186; F16K 15/188
See application file for complete search history.

(56) References Cited

U.S. PATENT DOCUMENTS

| | | |
|---|---|---|
| 7,537,140 B2 | 5/2009 | Lin |
| 2009/0200339 A1 | 8/2009 | Quinlan et al. |
| 2013/0206794 A1 | 8/2013 | McNulty et al. |
| 2015/0090737 A1 | 4/2015 | Ciavarella et al. |
| 2019/0335958 A1 | 11/2019 | Proper et al. |

* cited by examiner

OUTLET VALVE ARRANGEMENTS FOR ENHANCED PUMP EFFICIENCY

RELATED APPLICATIONS

This application is a continuation application of U.S. patent application Ser. No. 16/282,462, titled Outlet Valve Arrangement for Enhanced Pump Efficiency, which was filed on Feb. 22, 2019 and which is incorporated herein by reference in its entirety. This application also claims priority to and the benefits of U.S. Provisional Patent Application Ser. No. 62/637,487, titled Outlet Valve Arrangement for Enhanced Pump Efficiency, which was filed on Mar. 2, 2018 and is incorporated herein by reference in its entirety.

BACKGROUND

Dispenser systems, such as soap, sanitizer, and lotion dispensers, provide a user with a selected amount of liquid upon actuation of the dispenser. Dispenser systems often use a pump to pump liquid from a container and into the hand of a user.

SUMMARY

An exemplary dispenser includes a housing, an inverted container disposed in the housing, an outlet nozzle, a pump, a first check valve, and a second check valve. The container holds a fluid. The pump is disposed between the container and the outlet nozzle. The pump includes a pump inlet in fluid communication with the container, a pump outlet in fluid communication with the outlet nozzle, and a pump chamber in fluid communication with the pump inlet and the pump outlet. The pump chamber is movable between an expanded position and a compressed position. The first check valve is disposed between the pump and the outlet nozzle, and the first check valve has a first cracking pressure. The second check valve is disposed between the first check valve and the outlet nozzle, and the second check valve has a second cracking pressure. The second cracking pressure of the second check valve is greater than the first cracking pressure of the first check valve.

Another exemplary dispenser includes a housing, an inverted container disposed in the housing, an outlet nozzle, a pump, a first check valve, and a second check valve. The inverted container holds a liquid. The pump is disposed between the container and the outlet nozzle. The pump includes a pump inlet, a pump outlet, and a pump chamber. The pump inlet is in fluid communication with the container and the pump chamber, and the pump outlet is in fluid communication with the pump chamber and the outlet nozzle. The pump chamber is movable between an expanded position and a compressed position. The first check valve is disposed between the pump and the outlet nozzle, and the first check valve has a cracking pressure that is less than about 0.5 psi. The second check valve is disposed between the first check valve and the outlet nozzle, and the second check valve has a cracking pressure that is greater than about 0.5 psi.

Another exemplary dispenser includes a housing, an actuator located within the housing, a container located within the housing, a pump, at least one fast acting outlet valve located downstream of the pump, a slow acting outlet valve located downstream of the fast acting outlet valve, and an outlet nozzle. The container carries a fluid that includes soap, lotion, or sanitizer. The pump has an inlet, at least two pump chambers, and an outlet. During a selected dispensing time, the fast acting outlet valve cycles open and closed at least two times for every time the slow acting outlet valve cycles open and closed.

Another exemplary dispenser includes a housing, an actuator located within the housing, a holder for holding a container, a pump, at least two outlet valves in series, and an outlet nozzle. The container holds a soap, sanitizer, or lotion. The pump has an inlet, at least one pump chamber, and an outlet. The at least two outlet valves are located downstream of the pump. During a selected dispensing time, at least one of the two outlet valves cycles open and closed at least two times for every time a second of the two outlet valves cycles open and closed.

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

Figure 1:
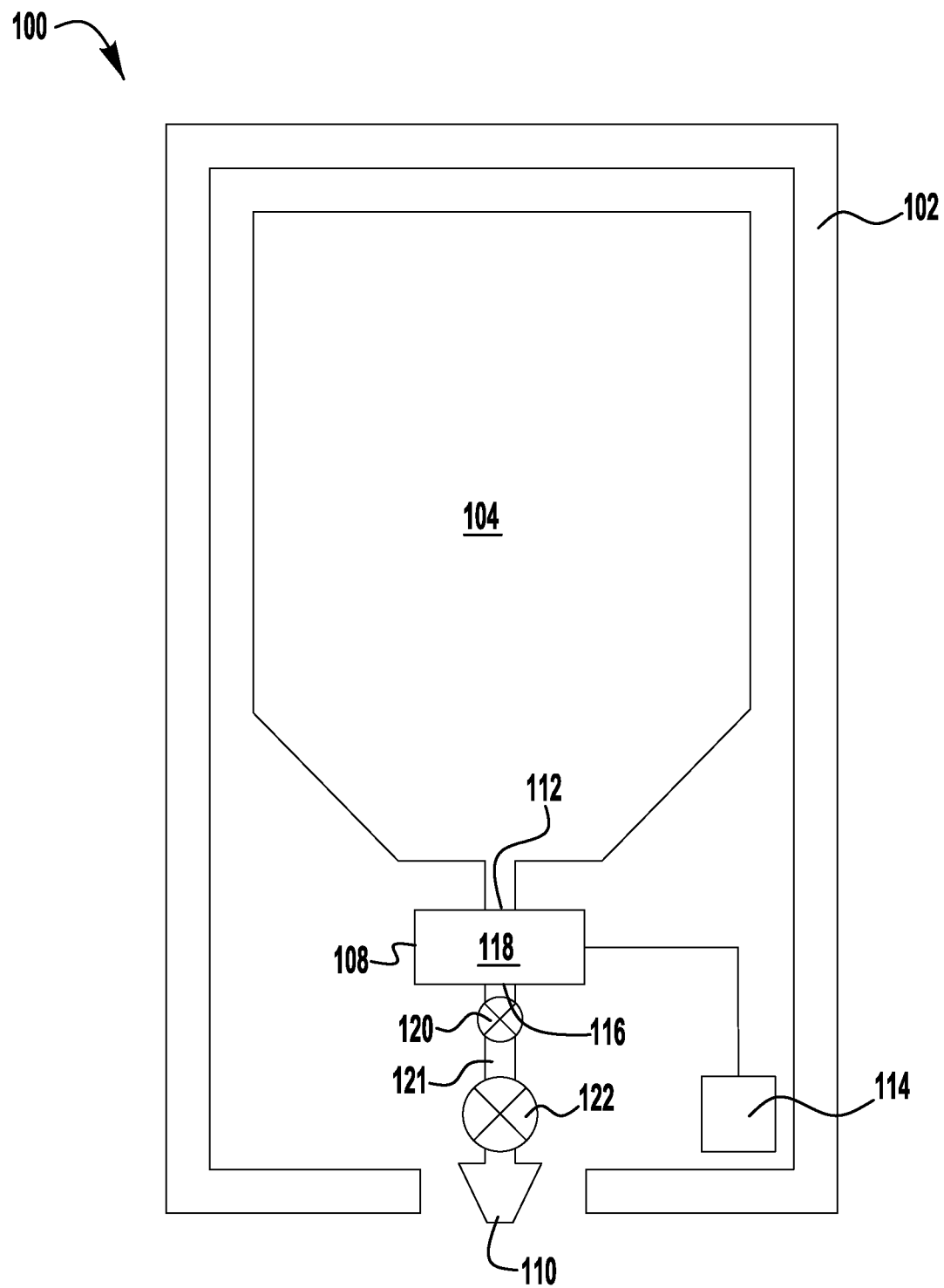
FIG. 1 is a cross-sectional view of an exemplary embodiment of a dispenser having a novel outlet valve arrangement.

FIG. 1 illustrates an exemplary dispenser 100 having a housing 102, a container 104 for holding a liquid, a pump 108, a first check valve 120, a second check valve 122, and a dispenser outlet 110. As shown in the illustrated embodiment, the dispenser is an inverted dispenser. The pump 108 is configured to pump the liquid from the container 104 through the outlet 110 and into the hand of a user. The liquid can be, for example, soap, a concentrated soap, a sanitizer, a lotion, a moisturizer or the like. The pump 108 may be, for example, a displacement pump, such as, for example, a piston pump, a diaphragm pump, a rotary pump, or the like. In certain embodiments, the pump 108 may be a sequentially activated multi-diaphragm pump. Exemplary embodiments of sequentially activated multi-diaphragm pumps are shown and disclosed in: U.S. Non-Provisional application Ser. No. 15/429,389 filed on Feb. 10, 2017 and titled HIGH QUALITY NON-AEROSOL HAND SANITIZING FOAM; U.S. Non-Provisional application Ser. No. 15/369,007 filed on Dec. 5, 2016 and titled SEQUENTIALLY ACTIVATED MULTI-DIAPHRAGM FOAM PUMPS, REFILL UNITS AND DISPENSER SYSTEMS; U.S. Non-Provisional patent application Ser. No. 15/355,112 filed on Nov. 18, 2016 and titled SEQUENTIALLY ACTIVATED MULTI-DIAPHRAGM FOAM PUMPS, REFILL UNITS AND DISPENSER SYSTEMS; U.S. Non-Provisional application Ser. No. 15/350,190 filed on Nov. 14, 2016 and titled IMPROVED FOAMING CARTRIDGE; U.S. Non-Provisional application Ser. No. 15/356,795 filed on Nov. 21, 2016 and titled FOAM DISPENSING SYSTEMS, PUMPS AND REFILL UNITS HAVING HIGH AIR TO LIQUID RATIOS; and U.S. Non-Provisional application Ser. No. 15/480,711 filed on Apr. 6, 2017 and titled FOAM DIS- PENSING SYSTEMS, PUMPS AND REFILL UNITS HAVING HIGH AIR TO LIQUID RATIOS; each of which are incorporated herein in their entirety.

In various embodiments, the dispenser 100 is a "touch free" dispenser and includes an actuator 114 that activates the pump 108 to pump liquid from the container 104 and out of the outlet nozzle 110 of the dispenser 100. In some embodiments, the liquid is combined with air and dispensed as a foam. Exemplary touch-fee dispensers are shown and described in U.S. Pat. No. 7,837,066 titled Electronically Keyed Dispensing System And Related Methods Utilizing Near Field Response; U.S. Pat. No. 9,172,266 title Power Systems For Touch Free Dispensers and Refill Units Containing a Power Source; U.S. Pat. No. 7,909,209 titled Apparatus for Hands-Free Dispensing of a Measured Quantity of Material; U.S. Pat. No. 7,611,030 titled Apparatus for Hans-Free Dispensing of a Measured Quantity of Material; U.S. Pat. No. 7,621,426 titled Electronically Keyed Dispensing Systems and Related Methods Utilizing Near Field Response; and U.S. Pat. Pub. No. 8,960,498 titled Touch-Free Dispenser with Single Cell Operation and Battery Banking; all which are incorporated herein by reference. In embodiments that include a touch-free feature, the dispenser 100 may include a power source (not shown), a sensor (not shown) for detecting the presence of a hand, a controller (not shown), and a motor (not shown), which are all known in the art. The power source is in electrical communication with and provides power to the sensor, controller, and motor. The power source may be an internal power source, such as, for example, one or more batteries or an external power source, such as, for example, solar cells, or a conventional 120 VAC power supply, or combinations thereof In various embodiments, the dispenser is a manual dispenser. In such embodiments, the actuator 114 may require manual activation, such as, for example, a user engages a push bar, a user engages a foot pedal, a pushbutton, or the like. In some embodiments that require manual activation, a push bar (not shown) is mechanically coupled to the pump 108 and, when a user engages the push bar, the pump causes liquid from the container 104 to exit the outlet nozzle 110 of the dispenser 100.

Still referring to FIG. 1, an exemplary embodiment of a pump 108 includes a pump inlet 112, a pump outlet 116, and a pump chamber 118. The pump inlet 112 is in fluid communication with the container 104 such that the pump inlet receives liquid from the container 104. The pump chamber 118 is in fluid communication with the pump inlet 112 such that the pump chamber 118 can receive liquid from the container 104 through the pump inlet 112. The pump outlet 116 is in fluid communication with the pump chamber 118 and with the outlet nozzle 110 such that the pump 108 can pump liquid from the pump chamber 118 through the pump outlet 116 and the outlet nozzle 110. In certain embodiments, the pump 108 is a positive displacement pump such that movement of the pump chamber 118 between an expanded position and a compressed position causes the pump 108 to pump liquid through the outlet nozzle 110 of the dispenser 100 and to move liquid from the container 104 and into the pump chamber 118. In certain embodiments, the pump chamber 118 has a small volume. In certain embodiments, the volume of pump chamber 118 is between about 0.2 cc and about 0.5 cc when the pump chamber 118 is in the expanded position.

The dispenser 100 includes a first check valve 120 and a second check valve 122. Both the first check valve 120 and the second check valve 122 are disposed between the pump 108 and the outlet nozzle 110. The first check valve 120 may be a normally closed valve disposed adjacent to the outlet 116 of the pump 108. In some embodiments, first check valve 120 may be normally open or have minimal to no cracking pressure. First check valve 120 is a fast acting valve.

Movement of the first check valve 120 from the closed position to an open position allows liquid in the pump chamber 118 to move past the first check valve 120 and into the area 121 between the first check valve 120 and the second check valve 122. Movement of the first check valve 120 from the open position back to the closed position prevents fluid, i.e. air or liquid, from flowing into the pump chamber 118 from the area 121 between the first check valve 120 and the second check valve 122.

It is advantageous to prevent air from entering the pump chamber 118 (during, for example, priming and use of the dispenser 100) from the area between first check valve 120 and second check valve 122, because air being compressed in the pump chamber 118 (and/or air in the pump chamber and the air between first check valve 120 and second check valve 122) affects the efficiency of the pump 108 and/or may prevent the pump 108 from priming. That is, if air enters the pump chamber 118 from area 121, during priming of the pump 108, the air will occupy a portion of the volume of the pump chamber 118, which will lead to less liquid, or no liquid at all, being pulled into the pump chamber 118. In addition, because air is more compressible than liquid, air in the pump chamber 118 may readily compress and expand with expansion and compression of the pump chamber 118 and not pump any liquid, or pump smaller doses of liquid than desired. In some embodiments, it is preferred that the first check valve 120 is located as close as possible to the downstream end of the pump chamber 118. The term pump outlet is used broadly herein and the first check valve 120 may be located in or at the opening of the pump outlet 116 from the pump chamber 118.

In certain embodiments, the first check valve 120 is a high flow, fast acting valve. For example, in some embodiments, the first check valve closes in less than about 0.1 seconds. In some embodiments, upon activation of the pump 108 (for example, using a sequentially activated diaphragm pump), the first check valve 120 will move from the closed position to the open position between about 5 times and about 20 times in about 0.5 seconds, such as, for example, about 10 times in 0.5 seconds. In certain embodiments, first check valve 120 has minimal cracking pressure. For example, in some embodiments, the cracking pressure of the first check valve 120 is between about 0 psi and about 2 psi. The first check valve 120 can be, for example, an umbrella valve, a duckbill valve, a flapper valve, or the like.

The second check valve 122 is disposed between the first check valve 120 and the outlet nozzle 110. The second check valve 122 is a normally closed valve. The second check valve 122 is configured to prevent liquid from flowing out of the outlet nozzle 110 of the dispenser 100 when the pump 108 is not in operation. Movement of the second check valve 122 from the closed position to an open position allows fluid in area 121 to exit the outlet nozzle 110 of the dispenser 100 and be dispensed into the hand of a user. After the fluid stops moving past the second check valve 122 and through the outlet nozzle 110, the second check valve 122 returns to the closed position, which prevents residual fluid in area 121 from flowing out of the dispenser 100 through outlet nozzle 110. Accordingly, the second check valve 122 acts as an anti-drip mechanism. In some embodiments, the second check valve 122 is a slow reacting high flow check valve. For example, in some embodiments, upon activation of the pump 108, the second check valve 122 remains in the open position for between about 0.25 seconds and about 0.75 seconds, such as about 0.5 seconds even though the first check valve 120 is opening and closing multiple times during the same time period. In certain embodiments, the second check valve 122 has a cracking pressure of 0.5 psi or greater, such as 0.75 psi or greater, such as 1 psi or greater, such as 1.25 psi or greater. The second check valve 122 can be, for example, a ball and spring valve, a mushroom valve, a flapper valve, or the like.

In certain embodiments, the second check valve 122 has a greater cracking pressure than the first check valve 120. In various embodiments, the second check valve 122 can have a cracking pressure between about 0.5 psi and about 3 psi, and the first check valve 120 can have a cracking pressure between about 0 psi and about 2 psi. In certain embodiments, the ratio of cracking pressure for the second check valve 122 to the cracking pressure for the first check valve 120 can be between about 2 to 1 and about 4 to 1. In alternative embodiments, the ratio of cracking pressure for the second check valve 122 to the cracking pressure of the first check valve 120 can be greater than 4 to 1, such as for example, 5 to 1, 6 to 1, 7 to 1, 8 to 1, 9 to 1, 10 to 1, 11 to 1 and 12 to 1.

To operate the dispenser 100, a user activates the pump 108 using the actuator 114, which causes fluid to flow from the pump chamber 118, through the outlet nozzle 110, and into a hand of the user. Activation of the pump 108 causes the pump chamber 118 to move from an expanded position to a compressed position, which causes the fluid in the pump chamber 118 to travel through the pump outlet 116 and engage the first check valve 120 such that a force is applied to the first check valve that causes the first check valve 120 to move to an open position. That is, the force applied by the fluid creates a pressure on the first check valve 120 that exceeds the cracking pressure of the first check valve, which causes the first check valve 120 to move to the open position. Movement of the first check valve 120 to the open position allows the fluid to move past the first check valve 120 and into the area 121 between the first check valve 120 and the second check valve 122. As fluid moves into the area 121, the fluid engages the second check valve 122 and applies a force to the second check valve 122 that causes the second check valve 122 to move to an open position. That is, the force applied by the fluid (from activation of the pump 108) creates a pressure on the second check valve 122 that exceeds the cracking pressure of the second check valve 122, which causes the second check valve 122 to move to the open position. Movement of the second check valve 122 to the open position allows the fluid to move past the second check valve 122, through the outlet nozzle 110 of the dispenser 100, and into the hand of a user. The contraction of pump chamber 118 also causes first check valve 120 to rapidly close in order to prevent fluid from being drawn in from area 121 and forcing fluid to be drawn in from container 104.

After any air from upstream of the pump chamber 118 exits the pump chamber 118, the pump 108 is primed (i.e., fluid is moved from the container 104 and into the pump chamber 118) such that another activation of the pump 108 causes fluid to be pumped toward the outlet nozzle 110 of the dispenser 100. When the pump chamber 118 fully compresses, fluid flow stops and the force applied by the fluid on the first check valve 120 decreases until the pressure applied on the first check valve 120 is less than the cracking pressure of the first check valve, which may cause the first check valve 120 to return to the closed position. In some embodiments, first check valve 120 does not return to a closed position until a negative pressure develops in pump chamber 118 (i.e. the pump chamber 118 begins to expand). As the fluid flow stops, the force applied by the liquid on the second check valve 122 will decrease until the pressure applied on the second check valve 122 is less than the cracking pressure of the second check valve, which will cause the second check valve to return to the closed position. Expansion and contraction of the pump chamber 118 cause the first check valve 120 to close and open respectively. In some embodiments, the opening and closing of first check valve 120, and hence the expansion and contraction of the pump chamber 118 happens fast enough that sufficient fluid flow continues through area 121 to keep second check valve 122 open. In many embodiments, there are more than one pump chambers 118 feeding area 121. In some embodiments multiple pump chambers 118 are sequenced so that one pump chamber 118 is expanding while another pump chamber is compressing, thus helping maintain a constant flow of fluid through area 121 and past second check valve 122.

In some embodiments, the volume of area 121 is greater than the volume of pump chamber 118. In some embodiments, the volume of area 121 is two ore more times the volume of pump chamber 118. In some embodiments, the volume of area 121 is three or more times the volume of pump chamber 118. In some embodiments, the volume of area 121 is four or more times the volume of pump chamber 118. In some embodiments, the volume of area 121 is five or more times the volume of pump chamber 118.

As the pump chamber 118 moves from the compressed position to the expanded position, a negative pressure is created in the pump chamber 118. The negative pressure in the pump chamber 118 causes liquid from the container 104 to enter the pump chamber through the pump inlet 112. In some embodiments, the first check valve 120 is advantageous because it prevents air and/or liquid in the area 121 from entering the pump chamber 118 through the pump outlet 116. If air and/or residual liquid enter the pump chamber 118 through the pump outlet 116 during operation of the pump 108, and, in particular, during priming of the pump, the pump 108 may be less efficient and possibly not prime. In some embodiments, the second check valve 122 is advantageous because it prevents residual fluid in the area 121 from dripping through the outlet nozzle 110 between activations of the pump 108.

Figure 2:
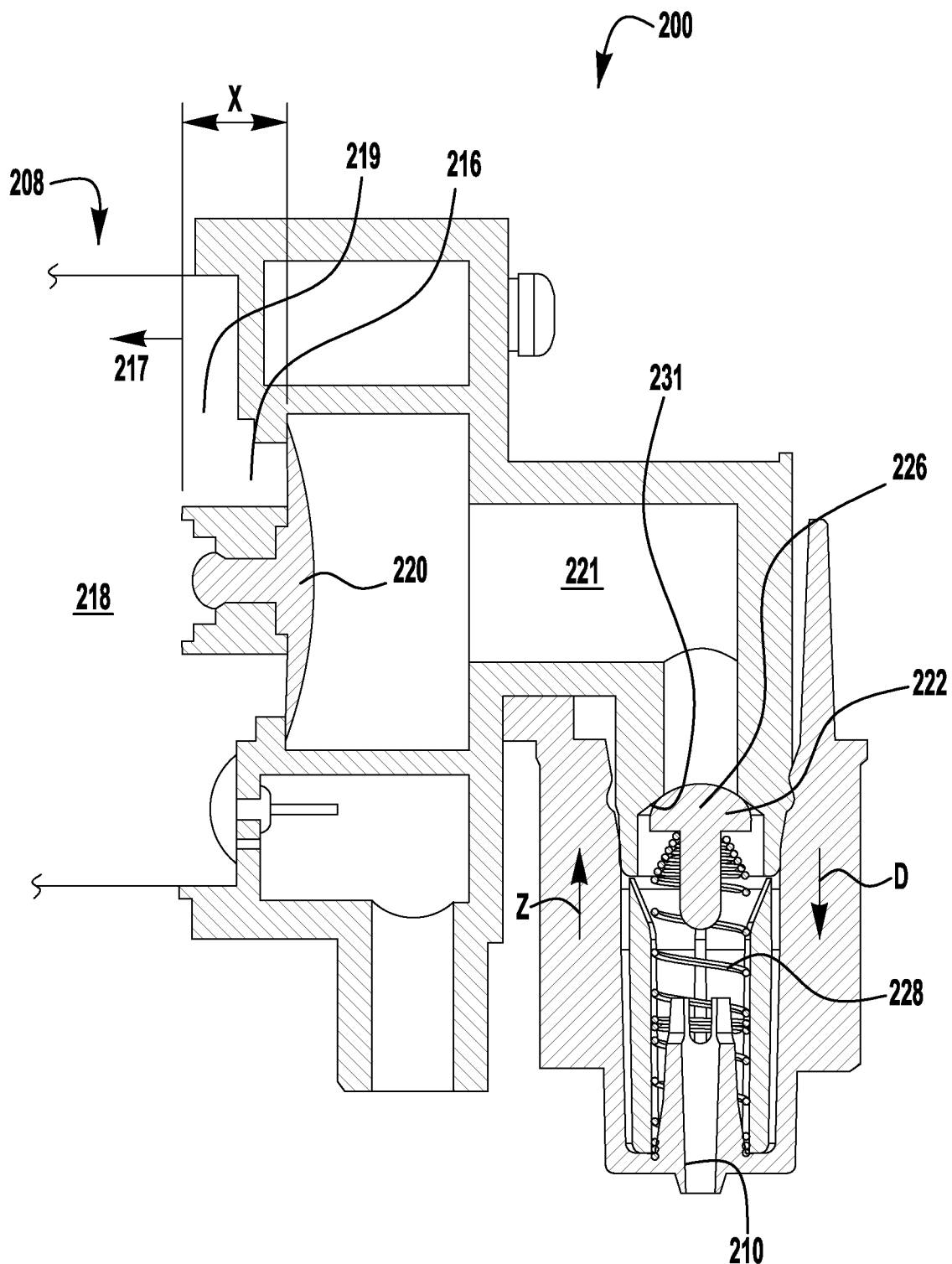
FIG. 2 is a partial cross-sectional view of an exemplary embodiment of a portion of another dispenser having a novel outlet valve arrangement.

FIG. 2 illustrates a cross sectional view of a portion of an exemplary dispenser 200 having a novel outlet valve arraignment. Dispenser 200 includes a pump 208, a first check valve 220, a second check valve 222, and an outlet nozzle 210. The pump includes a pump inlet (not shown) that is in fluid communication with a container (not shown) of the dispenser 200, a pump chamber 218, and a pump outlet 216. The pump 208 is an inverted setup, i.e. a container (not shown) full of fluid is in fluid communication with the pump chamber 218 and is positioned so that at least a portion of the fluid in the container is located above the pump chamber 218. The pump chamber 218 is movable between an expanded position and a compressed position.

In certain embodiments, the pump chamber 218 includes a compressible portion 217 and a non-compressible portion 219. The volume of the compressible portion 217 of the pump chamber 218 moves between an expanded volume (i.e., the volume of the pump in the expanded state) and a compressed volume when the pump chamber is in the compressed state. The volume of the non-compressible portion 219 of the pump chamber 218 remains constant. In certain embodiments, the volume of the compressible portion 217 is between about 80% and about 100% of the volume of the entire pump chamber (i.e., the volume of both the compressible portion 217 and the non-compressible portion 219). In some embodiments, it is advantageous to have a pump chamber 218 that includes a compressible portion 217 that has a volume between 80% and 100% of the volume for the entire pump chamber because a positive displacement pump is more efficient if a larger portion of the volume for the pump chamber is compressible. In certain embodiments, the pump chamber 218 is a small pump chamber. For example, the pump chamber 218 can have a volume between about 0.2 cc and about 0.5 cc when the pump chamber is in the expanded position.

The first check valve 220 and the second check valve 222 are disposed between the pump 208 and the outlet nozzle 210. The first check valve 220 is disposed between the pump 208 and the second check valve 222. In certain embodiments, the first check valve 220 is disposed adjacent to the pump chamber 218 of the pump 208. In some embodiments, the first check valve 220 is disposed a distance X away from the compressible portion 217 of the pump chamber 218. The distance X can be, for example, between about 0 inches and about 0.375 inches, such as between about 0.125 inches and about 0.25 inches. In certain embodiments, the distance X can be 0.5 inches or less, such as about 0.375 inches or less, such as about 0.25 inches or less, such as about 0.125 inches or less.

In some embodiments, the first check valve 220 is a normally closed valve that prevents liquid from exiting the pump chamber 218 through the pump outlet 216 when the first check valve 220 is in a closed position. In some embodiments, first check valve 220 has a neutral state or has a very slight cracking pressure to open, provided that first check valve 220 quickly closes upon minimal vacuum pressure in pump chamber 218. Movement of the first check valve 220 from the closed position to an open position allows liquid in the pump chamber 218 to move past the first check valve 220 and into the area 221 between the first check valve and the second check valve 222. Movement of the first check valve 220 from the open position back to the closed position prevents liquid and/or air from entering the pump chamber 218 from area 221 of the pump 208. It is advantageous to prevent air from entering the pump chamber 218 (during, for example, priming and use of the dispenser 200) because air being compressed in the pump chamber 218 affects the efficiency of the pump 208. That is, if air enters the pump chamber 218 during priming of the pump, the air will occupy a portion of the volume of the pump chamber, which may lead to less fluid being drawn in the pump chamber 218, or simply compressing and decompressing the air in the pump chamber 218 resulting in the pump 208 not priming or taking a long period of time to prime.

In some embodiments, upon activation of the pump 208, the first check valve 220 will rapidly move between the closed position and the open position between about 5 times and about 20 times in about 0.5 seconds, such as about 10 times in about 0.5 seconds. In certain embodiments, the first check valve 120 is a high flow, fast acting valve. For example, in some embodiments, the first check valve 220 closes in less than about 0.1 seconds. In certain embodiments, first check valve 120 has minimal cracking pressure. For example, the cracking pressure of the first check valve 120 is between about 0 psi and about 2 psi. In the illustrated embodiment, the first check valve 220 is an umbrella valve. In alternative embodiments, the first check valve can be a duckbill valve, a flapper valve, or the like.

In certain embodiments, the pump 208 is a sequentially-activated multi-diaphragm pump that has a plurality of pump chambers (e.g., the pump chamber 218 described above). In some of these embodiments, a check valve (e.g., the first check valve 220 described above) may be disposed adjacent to each of the pump chambers such that each of the check valves is disposed between the corresponding pump chamber and the second check valve 222. In other embodiments, a single check valve (e.g., the first check valve 218 described above) may be disposed adjacent to all of the pump chambers such that the single check valve is disposed between each of the pump chambers and the second check valve 222. In the above-mentioned embodiments, the check valve(s) between the pump chambers and the second check valve 222 may take any form and act in any manner described herein with regard to the first check valve 220. In the above-mentioned embodiments, the check valve(s) 220 between the pump chambers and the second check valve 222 may rapidly move between the closed position and the open position upon activation of the pump. For example, the check valve(s) 220 may move between closed position and the open position between about 5 times and about 20 times in about 0.5 seconds, such as about 10 times in about 0.5 seconds. In addition, in the above-mentioned embodiments, the check valve(s) may be high flow, fast acting valves that close in less than about 0.1 seconds. The check valve(s) may also have a minimal cracking pressure, such as, for example, between about 0 psi and about 2 psi. The check valve(s) may be an umbrella valve, a duckbill valve, a flapper valve, or the like.

In this exemplary embodiment, the second check valve 222 includes a mushroom member 226 and a biasing member 228 (e.g., a spring). Other check valves with similar properties may be used, such as, for example, a spring and ball valve. The second check valve 222 is movable between an open position and a closed position. The second check 222 valve is in the closed position when the mushroom member 226 engages an sealing surface 231 of the area 221, and the second check valve 222 is in the open position when the mushroom member 226 is moved away from the sealing surface 231 in the direction D. In certain embodiments, the second check valve 222 is a normally closed valve, in which the biasing member 228 exerts a force on the mushroom member 226 in the direction Z that causes the second check valve to maintain the closed position. When the second check valve 220 is in the closed position, fluid in the area 221 is prevented from moving past second check valve 220 and outlet nozzle 210. Movement of the mushroom member 226 in the direction D moves the second check valve 222 to the open position and allows fluid from the area 221 to move past second check valve 222 and through the outlet nozzle 210. In certain embodiments, the second check valve 222 is a high flow valve that is configured to prevent static drip of fluid from the outlet nozzle 210 when the second check valve 222 is in the closed position. In some embodiments, the second check valve 222 is a slow acting check valve that, for example, has a cracking pressure of 0.5 psi or greater, such as 0.75 psi or greater, such as 1 psi or greater, such as 1.25 psi or greater. In some embodiments, upon activation of the pump 208, the second check valve 222 will remain in the open position for between about 0.25 seconds and about 0.75 seconds (the operating time to dispense a selected dose of fluid), such as about 0.5 seconds even though first check valve 220 opens and closes multiple times in that same time period. In the illustrated embodiment, the second check valve 222 is a mushroom valve. In alternative embodiments, the second check valve 222 can be, for example, a ball and spring valve, a flapper valve, or the like.

In certain embodiments, the second check valve 222 has a greater cracking pressure than the first check valve 220. In various embodiments, the second check valve 222 has a cracking pressure between about 0.5 psi and about 3 psi, and the first check valve 220 has a cracking pressure between about 0 psi and about 2 psi. In certain embodiments, the ratio of cracking pressure for the second check valve 222 to the cracking pressure for the first check valve 220 is between about 2 to 1 and about 4 to 1. In alternative embodiments, the ratio of cracking pressure for the second check valve 222 to the cracking pressure of the first check valve 220 can be greater than 4 to 1.

To operate the dispenser 200, a user activates the pump 208 using the actuator (not shown), which causes fluid to flow from the pump chamber 218, through the outlet nozzle 210, and into a hand of the user. Activation of the pump 208 causes the pump chamber 218 to move from an expanded position to a compressed position, which causes the fluid in the pump chamber 218 to travel through the pump outlet 216 past the first check valve 220 with a force sufficient to cause the first check valve 220 to move to an open position. That is, the force applied by the fluid creates a pressure on the first check valve 220 that exceeds the cracking pressure of the first check valve 220 which causes the first check valve 220 to move to the open position. Movement of the first check valve 220 to the open position allows the fluid to move past the first check valve 220 and into the area 221 between the first check valve 220 and the second check valve 222. As fluid moves through the area 221, the fluid engages the second check valve 222 with a force is applied to the mushroom member 226 of the second check valve 222 sufficient to cause the mushroom member 226 to move to an open position in the direction D. That is, the force applied by the fluid (from activation of the pump) also creates a pressure on the second check valve 222 that exceeds the cracking pressure of the second check valve, which causes the second check valve to move to the open position. Movement of the second check valve 222 to the open position allows the fluid to flow past the second check valve 222, through the outlet nozzle 210 of the dispenser 200, and into the hand of a user. The contraction of pump chamber 218 also causes first check valve 120 to rapidly close in order to prevent fluid from being drawn in from area 221 and forcing fluid to be drawn in from container.

After air from upstream of the pump chamber 218 exits the pump chamber 218, the pump 208 is primed (i.e., fluid is moved from the container and into the pump chamber 218) such that another activation of the pump causes fluid to be pumped toward the outlet nozzle 210 of the dispenser 200. In some embodiments, multiple pump chambers 218 are used. In some embodiments, one or more of the multiple pump chambers 218 pump air, and thus do not need to prime and the remaining pump chambers 218 pump liquid. In some embodiments, the one or more pump chambers 218 pump a mixture of liquid and air, and thus are primed when a selected percentage of the volume comprises liquid. As the pump chamber 218 is fully compressed, the force applied by the liquid on the first check valve 220 will decrease until the pressure applied on the first check valve is less than the cracking pressure of the first check valve, which may cause the first check valve 220 to return to the closed position. In some embodiments, first check valve 220 does not return to a closed position until a negative pressure develops in pump chamber 218. As the fluid stops flowing out of the outlet nozzle 210, the force applied by the liquid on the second check valve 222 will decrease until the pressure applied on the second check valve 222 is less than the cracking pressure of the second check valve, which will cause the second check valve 222 to return to the closed position.

As the pump chamber 218 moves from the compressed position to the expanded position, a negative pressure is created in the pump chamber 218. The negative pressure in the pump chamber 218 causes liquid from the container to enter the pump chamber through the pump inlet 212 and causes the first check valve 220 to close. In some embodiments, the first check valve 220 is advantageous because it prevents air and/or liquid in the area 221 from entering the pump chamber 218 through the pump outlet 216. If air and/or residual liquid enter the pump chamber 218 through the pump outlet 116 during operation of the pump 208, and, in particular, during priming of the pump, the pump 208 may be less efficient and possibly not prime. In some embodiments, the second check valve 222 is advantageous because it prevents residual fluid in the area 221 from dripping through the outlet nozzle 210 between activations of the pump 208.

The exemplary embodiments of the pumps, first check valves, and second check valves described herein can be part of a replaceable refill unit for a dispenser, or can be fixed to the housing of a dispenser. In addition, the exemplary first and second check valves described herein can be disposed within the housing of the pump, or can be separate from the pump.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions--such as alternative materials, structures, configurations, methods, circuits, devices and components, software, hardware, control logic, alternatives as to form, fit and function, and so on--may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A dispenser comprising:
a housing;
an actuator located within the housing;
a holder for holding a container of soap, sanitizer or lotion;
a sequentially activated multi-diaphragm pump having a plurality of pump chambers;
the pump having an inlet, the plurality of pump chambers, and an outlet;
a first outlet valve located downstream of at least one of the plurality of pump chambers;
a second outlet valve located downstream of the first outlet valve;
a conduit located between the first outlet valve and the second outlet valve; and
an outlet nozzle;
wherein, during a selected dispensing time, the first outlet valve cycles open and closed at least two times for every time the second outlet valve cycles open and closed.

2. The dispenser of claim 1, wherein the first outlet valve is a normally-closed valve.

3. The dispenser of claim 1, wherein the first outlet valve has a minimal cracking pressure.

4. The dispenser of claim 3, wherein the minimal cracking pressure is between 0 and 2 psi.

5. The dispenser of claim 1, wherein the second outlet valve has a cracking pressure that is configured to prevent fluid flow from the container through the at least one of the plurality of pump chambers when the at least one of the plurality of pump chambers is not operating.

6. The dispenser of claim 1, wherein the first outlet valve is one of an umbrella valve, a duckbill valve and a flapper valve.

7. The dispenser of claim 1, wherein the second outlet valve is a ball and spring valve.

8. The dispenser of claim 1, further comprising a third outlet valve disposed between the pump and the second outlet valve;
wherein movement of a first pump chamber causes the first outlet valve to move to an open position such that fluid flows from the first pump chamber, past the first outlet valve, past the second outlet valve, and out of the outlet nozzle; and
wherein movement of a second pump chamber causes the third outlet valve to move to an open position such that fluid flows from the second pump chamber, past the third outlet valve, past the second outlet valve, and out of the outlet nozzle.

9. The dispenser of claim 1, wherein the-at least one of the plurality of pump chambers has a volume of between about 0.2 cc and about 0.5 cc when the at least one of the plurality of pump chambers is in an expanded position.

10. The dispenser of claim 1, wherein a ratio of a cracking pressure of the second outlet valve to a cracking pressure of the first outlet valve the second cracking pressure to the first cracking pressure is between about 2 to 1 and about 4 to 1.

11. A dispenser comprising:
a housing;
an actuator located within the housing;
a holder for holding a container of soap, sanitizer or lotion;
a sequentially activated multi-diaphragm pump having a plurality of pump chambers;
the pump having an inlet, the plurality of pump chambers, and an outlet;
the plurality of pump chambers comprising at least one liquid pump chamber;
the at least one liquid pump chamber having a pump chamber volume that is the volume of the expanded pump chamber;
a first outlet valve located downstream of the at least one pump chamber;
a second outlet valve located downstream of the first outlet valve;
a conduit located between the first outlet valve and the second outlet valve;
the conduit having a conduit volume that is the volume of the area between the first outlet valve and the second outlet valve; and
an outlet nozzle;
wherein, the conduit volume is greater than the pump chamber volume.

12. The dispenser of claim 11 wherein the conduit volume is greater than two times the volume of the at least one liquid pump chamber.

13. The dispenser of claim 11 wherein the conduit volume is greater than three times the volume of the at least one liquid pump chamber.

14. The dispenser of claim 11 wherein the conduit volume is greater than four times the volume of the at least one liquid pump chamber.

15. A dispenser for dispensing soap, sanitizer or lotion comprising:
a housing;
a container having a liquid outlet located proximate the bottom of the container disposed in the housing holding a soap, a sanitizer or a lotion;
an outlet nozzle; and
a sequentially activated multi-diaphragm pump having a plurality of pump chambers;
the pump disposed between the container and the outlet nozzle, the pump having:
a pump inlet in fluid communication with the container;
a pump outlet in fluid communication with the outlet nozzle;
at least one liquid pump chamber of the plurality of pump chambers is in fluid communication with the pump inlet and the pump outlet, wherein the liquid pump chamber is movable between an expanded position and a compressed position;
a fast acting check valve disposed between the pump outlet and the outlet nozzle
a slow acting check valve disposed between the fast acting check valve and the outlet nozzle;
wherein the fast acting check valve opens and closes more times than the slow acting check valve during a dispense of fluid from the dispenser.

16. The dispenser of claim 15, wherein the fast acting check valve is one of an umbrella valve, a duckbill valve, and a flapper valve.

17. The dispenser of claim 15, wherein the slow acting check valve is a ball and spring valve.

18. The dispenser of claim 15, further comprising a second fast acting check valve disposed between the pump and the slow acting check valve;
wherein movement of a first pump chamber of the plurality of pump chambers causes the fast acting check valve to open and close; and wherein movement of a second pump chamber of the plurality of pump chambers causes the second fast acting check valve to open and close;

and wherein fluid that flows past the first fast acting check valve and the second fast acting check valve, causes the slow acting check valve to open to allow the fluid to flow past.

\* \* \* \* \*